United States Patent
Stoltz

(10) Patent No.: US 10,781,951 B2
(45) Date of Patent: Sep. 22, 2020

(54) ANTI-BINDING BALL SWIVEL

(71) Applicant: NC Brands L.P., Norwalk, CT (US)

(72) Inventor: Herman Stoltz, Port Elizabeth (ZA)

(73) Assignee: NC Brands L.P., Norwalk, CT (US)

( * ) Notice: Subject to any disclaimer, the term of this patent is extended or adjusted under 35 U.S.C. 154(b) by 354 days.

(21) Appl. No.: 15/596,121

(22) Filed: May 16, 2017

(65) Prior Publication Data

US 2017/0292645 A1 Oct. 12, 2017

(51) Int. Cl.
| | |
|---|---|
| *F16L 27/04* | (2006.01) |
| *B05B 15/654* | (2018.01) |
| *B05B 15/18* | (2018.01) |
| *A47L 9/24* | (2006.01) |
| *F16L 27/02* | (2006.01) |

(52) U.S. Cl.
CPC ............. *F16L 27/04* (2013.01); *A47L 9/242* (2013.01); *B05B 15/18* (2018.02); *B05B 15/654* (2018.02); *F16L 27/023* (2013.01)

(58) Field of Classification Search
CPC ..... F16L 27/04; F16L 27/023; F16L 27/0849; B05B 15/654; A47L 9/242
USPC ... 285/145.3, 146.1, 146.2, 146.3, 184, 261, 285/282
See application file for complete search history.

(56) References Cited

U.S. PATENT DOCUMENTS

| | | | |
|---|---|---|---|
| 910,687 A * | 1/1909 | Jenkins | F16L 27/04 285/261 |
| 1,614,667 A * | 1/1927 | Gillick | 285/146.2 |
| 4,946,202 A * | 8/1990 | Perricone | F16L 27/04 |
| 6,220,636 B1 | 4/2001 | Veloskey et al. | |
| 6,305,621 B1 | 10/2001 | Kolacz et al. | |
| 7,464,429 B2 | 12/2008 | Stoltz | |
| 2003/0077110 A1* | 4/2003 | Knowles | F16L 27/04 |
| 2015/0001842 A1* | 1/2015 | Jones | 285/261 |

FOREIGN PATENT DOCUMENTS

EP     2957807 A1    4/2001

OTHER PUBLICATIONS

PCT International Searching Authority: International Search Report and Written Opinion dated Aug. 14, 2017; entire document.

* cited by examiner

*Primary Examiner* — Zachary T Dragicevich
(74) *Attorney, Agent, or Firm* — Merchant & Gould P.C.; Daniel R. Evans

(57) ABSTRACT

A ball swivel of the configuration typically utilized for pool cleaners includes male and female portions featuring an interposed stopper to minimize an area of engagement between the male and female portions under load, while still sealing and allowing rotational and pivotal motion.

19 Claims, 4 Drawing Sheets

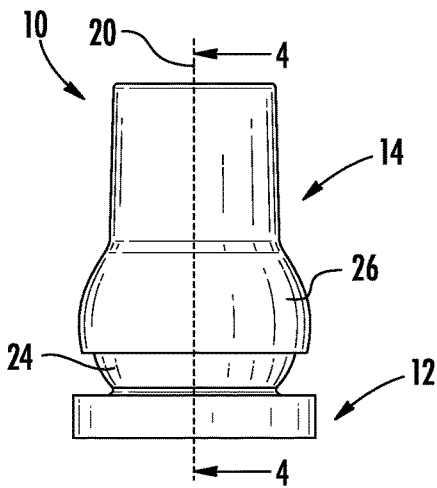
(Prior Art) *FIG. 1*
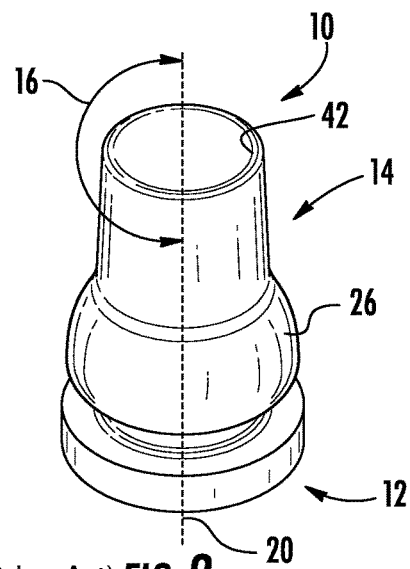
(Prior Art) *FIG. 2*
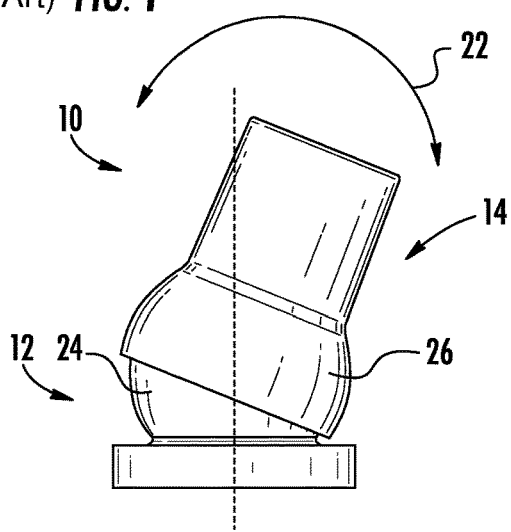
*FIG. 3* (Prior Art)
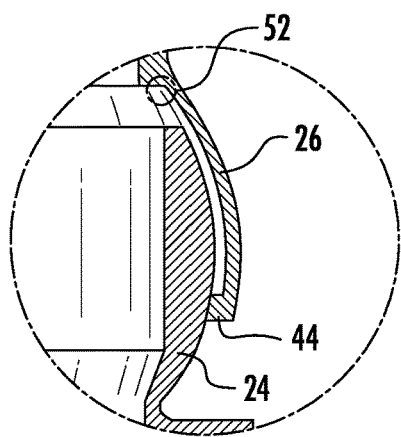
*FIG. 5* (Prior Art)
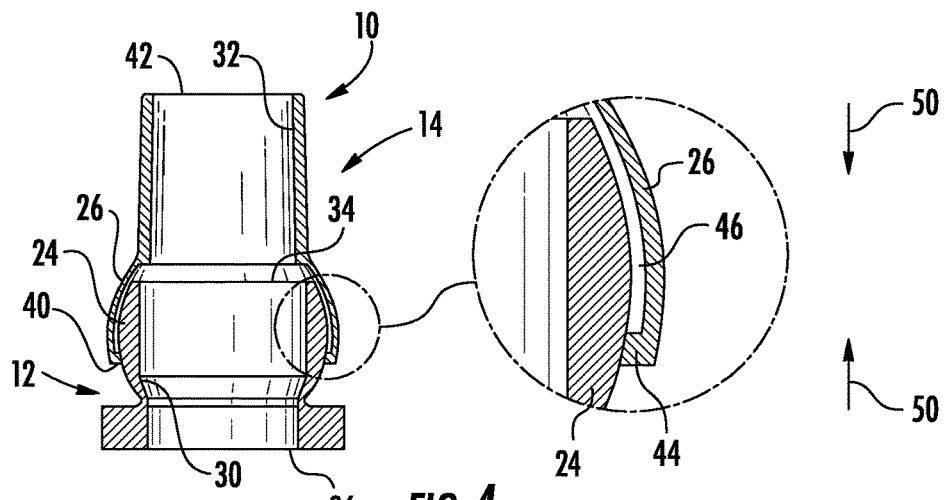
*FIG. 4*
(Prior Art)

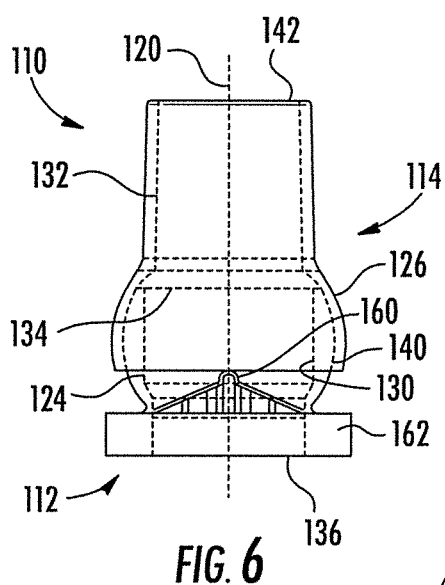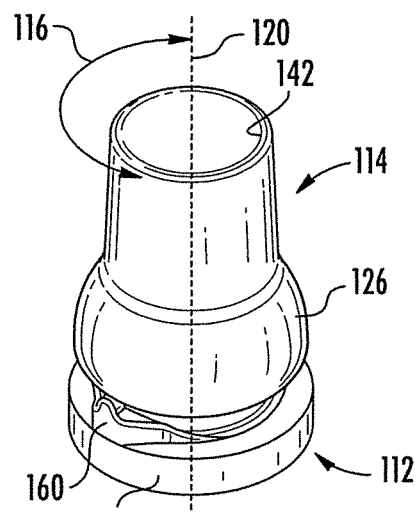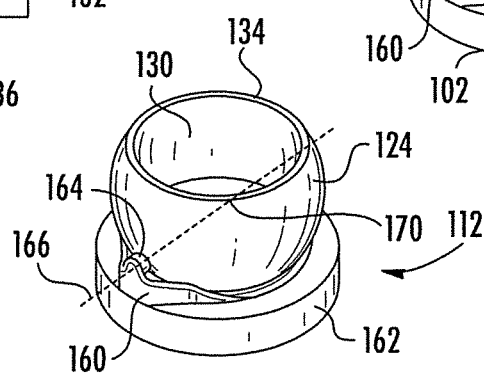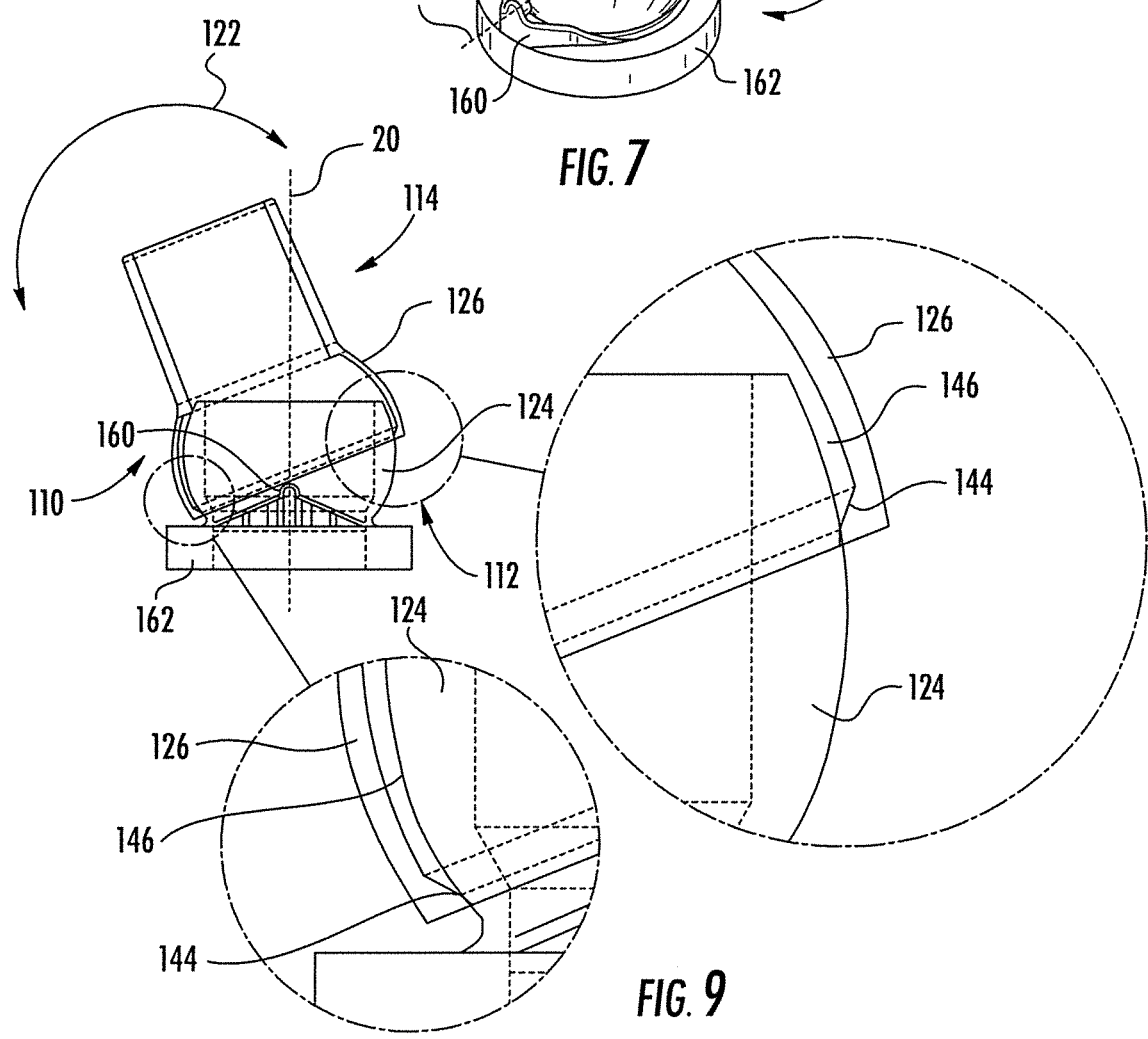

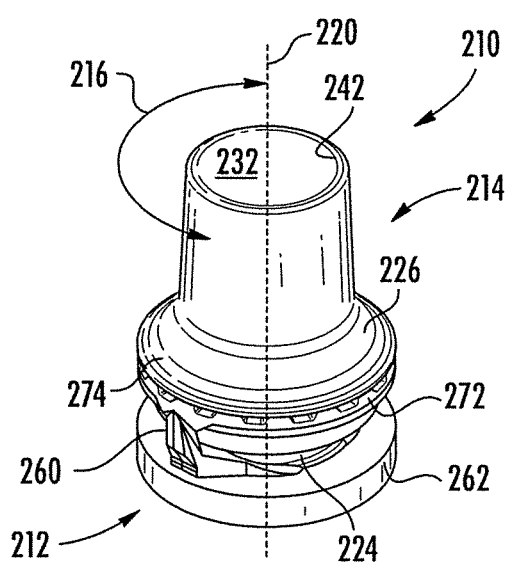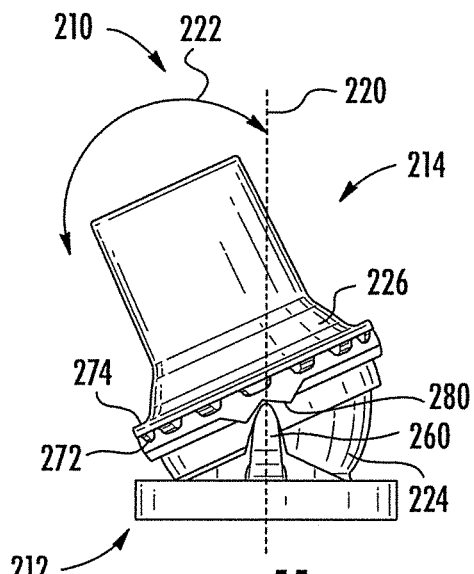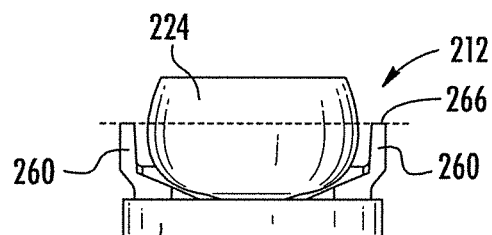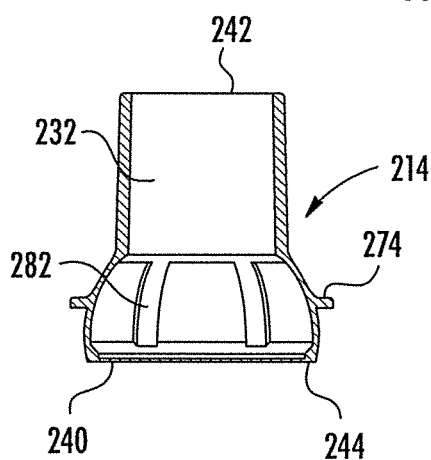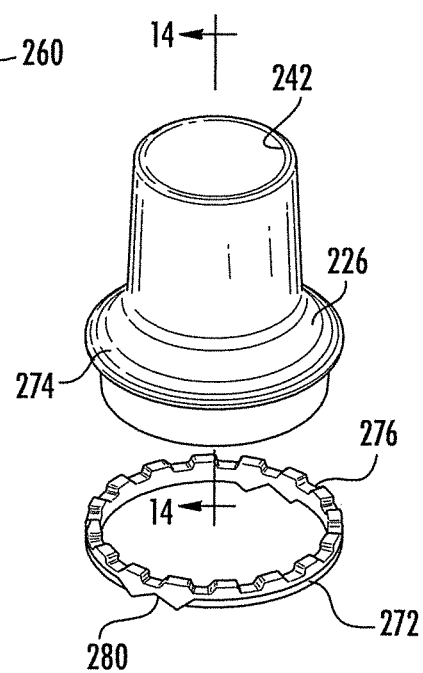
FIG. 10
FIG. 11
FIG. 12
FIG. 14
FIG. 13

ANTI-BINDING BALL SWIVEL

CROSS-REFERENCE TO RELATED APPLICATION

This application claims the benefit of U.S. Provisional Application Ser. No. 62/308,901, filed on Mar. 16, 2016, the contents of which are herein incorporated by reference in their entirety.

FIELD OF THE INVENTION

The present invention relates to ball swivels, and more particularly, to ball swivels used to connect a water hose to a pool cleaner.

BACKGROUND OF THE INVENTION

Frequently, pool cleaners—and more often, suction-type pool cleaners—utilize some kind of swivel mechanism between the pool cleaner and the water hose. Various mechanisms claim to improve coiling of the hose and or influence of the hose on the random movement on the pool cleaner. One type utilizes a non-articulating linear swivel attached to the cleaner while others utilize a linear swivel within the suction line in conjunction with a ball swivel or linear swivel attached to the cleaner to try to improve performance. Some linear swivels, for positioning on cleaner or in the suction line, incorporate ball bearings to allow for free rotation and prevent binding up under load.

An example of a ball swivel can be seen in U.S. Pat. No. 6,220,636, the contents of which are herein incorporated by reference in their entirety. In this patent, an improved ball swivel is described detailing the benefits a ball swivel provides for suction-type pool cleaners. A main benefit of the ball swivel, apart from dealing well with large debris passed by the pool cleaner, is the means to provide both a 360 degree rotational as well as pivoting, articulating function in a single swivel consisting of only 2 moveable parts. Further benefits of ball swivels for pool cleaners include improved transitioning between horizontal and vertical surfaces as well as relieving the drag of hoses on the pool cleaner due to water resistance.

In U.S. Pat. No. 6,220,636, internal ribs are used to reduce the contact area between the male and female portions of the ball swivel, as well as to prevent smaller debris from binding up the swivel. A sealing wiper is also included to provide a better type of seal between the male and female portion of the swivel. In U.S. Pat. No. 7,464,429, the contents of which are also herein incorporated by reference in their entirety, two swivels are combined utilizing a dual ball as a means to increase the range of articulation.

A common problem with all swivels is that when suction is applied via the hose, the forces acting on the swivel components will increase to eventually cause a binding effect on the swivel. The higher the suction, the more the pivotal and rotational functions of the swivel will be adversely affected—up to a point where the swivel may become totally ineffective.

The binding effect due to increased suction is significantly larger on a ball swivel than on the linear swivels typically used for this type of application. This is due to the larger contact surface area between the movable parts. Also, common method available to overcome the binding effect in linear swivels is to minimize the contact surface area between the swivel components by means of a spacer typically made of a low friction material.

However due to the ball swivel having a large internal contact area between the male and female parts even reducing the contact surface area by creating cavities between ribs (e.g., as described in U.S. Pat. No. 6,220,636) the pool cleaner performance is impaired due to the high degree of friction limiting the freedom of pivotal and rotational motion.

SUMMARY OF THE INVENTION

In view of the foregoing, it is an object of the present invention to provide an improved ball swivel for a pool cleaner. According to an embodiment of the present invention, a ball swivel comprises first male and female portions and at least a first stopper. The first male portion includes a truncated ball, a male fluid passage being formed through the first male portion extending between first and second male portion openings, the first male portion opening being located on the truncated ball. The first female portion includes a socket receiving the truncated ball via a first female portion opening, a female fluid passage extending from a second female portion opening and communicating with the male fluid passage through the first male portion opening, the socket retaining the truncated ball such that the first female and male portions are capable of relative rotational motion about a longitudinal axis separating the first male and female portion openings and relative pivotal motion toward and away from the longitudinal axis. The first stopper is arranged externally to the first male and female portions delimiting relative translation movement therebetween in at least one direction along the longitudinal axis while still permitting the relative rotational motion and the relative pivotal motion.

According to an aspect of the present invention, first and second stoppers engage the first female portion at respective contact points separated by a stopper axis passing through a center point of the truncated ball, the relative pivotal motion between the first male and female portions being constrained to pivoting about the stopper axis. According to another aspect of the present invention, a spacer is arranged between the first female portion and the first stopper such that the first stopper engages the first female portion through the spacer. According to an additional aspect of the present invention, the ball swivel is formed as a dual ball swivel.

These and other objects, aspects and advantages of the present invention will be better appreciated in view of the drawings and following detailed description of preferred embodiments.

BRIEF DESCRIPTION OF THE DRAWINGS

FIG. 1 is a side view of a conventional ball swivel;

FIG. 2 is a perspective view of the ball swivel of FIG. 1;

FIG. 3 is a perspective view of the ball swivel of FIG. 1, pivoted away from a longitudinal axis;

FIG. 4 is a sectional view taken along line 4-4 of FIG. 1, with an inset detailing a relationship of components under no load;

FIG. 5 is alternate detail view of the general area of the inset of FIG. 4, showing a relationship of components under a suction load;

FIG. 6 is a side view of a ball swivel according to an embodiment of the present invention, with hidden features shown in broken lines;

FIG. 7 is a perspective view of a male portion of the ball swivel of FIG. 6;

FIG. 8 is a perspective view of the ball swivel of FIG. 6;

FIG. 9 is a side view of the ball swivel of FIG. 6, pivoted away from a longitudinal axis, with hidden features shown in broken lines, and with insets detailing component relationships;

FIG. 10 is a perspective view of a ball swivel according to another embodiment of the present invention;

FIG. 11 is a side view of the ball swivel of FIG. 10, pivoted away from a longitudinal axis;

FIG. 12 is a side view of a male portion of the ball swivel of FIG. 10;

FIG. 13 is an exploded perspective view of a female portion and spacer of the ball swivel of FIG. 10;

FIG. 14 is a sectional view of the female portion of the ball swivel of FIG. 10, taken along line 14-14 of FIG. 13;

DETAILED DESCRIPTION OF PREFERRED EMBODIMENTS

Figure 15:
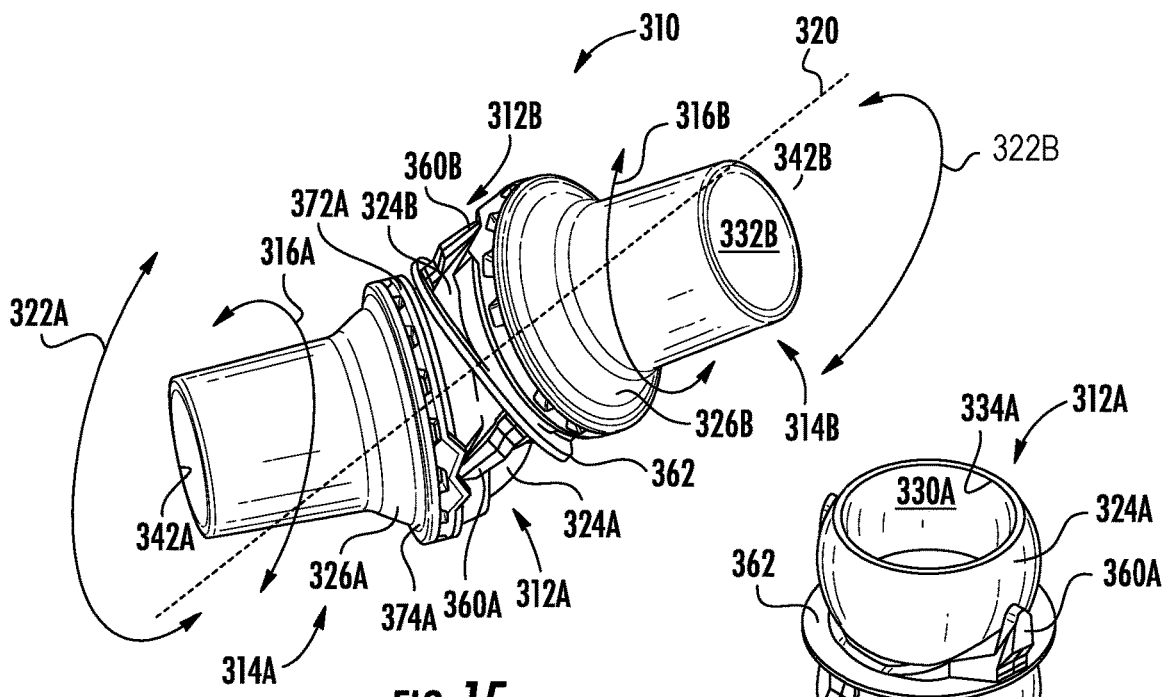
FIG. 15 is a perspective view of dual ball swivel, according to a further embodiment of the present invention.

Referring in FIG. 1, in a conventional ball swivel 10, a male portion 12 and female portion 14 are so as to permit rotational motion 16 about a longitudinal axis 20 of the swivel 10, as well as pivotal motion 22 toward and away from the axis 20. More specifically, the male portion 12 includes a truncated ball 24 that is received in a complementary socket 26 of the female portion 14.

Fluid flows through swivel via communicating male and female fluid passages 30, 32 of the male and female portions 12, 14. The male fluid passage 30 extends between a first male portion opening 34 on the truncated ball 24 and a second male portion opening 36. The socket 26 receives the ball 24 via a first female portion opening 40, with the female fluid passage extending to a second female portion opening 42. A wiper seal 44 extends toward the ball 24 around a perimeter of the first female portion opening 40, and is intended to minimize fluid leakage by sealing the gap 46 between the ball 24 and socket 26.

With the ball swivel 10 connected to water hose and suction applied, the male and female portions are urged toward each other in the general direction of the longitudinal axis 20, as indicated by arrows 50. In the conventional ball swivel 10, this results in undesirable effects. Referring to FIG. 5, with suction forces effectively urging the socket 26 further onto the truncated ball 24, the socket 26 becomes misaligned and is forced into contact with the ball 24—as is occurring in the designated area 52. This contact creates binding that impedes or eliminates the capacity of the swivel 10 for rotational and pivotal motion 16, 22.

Additionally, this misalignment between the ball 24 and socket 26 also urges the wiper seal 44 away from the ball 24. Where the internal surface of the socket 26 is formed with ribs (used to assist in the management of small debris—see, e.g., FIG. 14, ribs 282), significant leakage can now occur past the wiper seal 44.

In subsequent ball swivel embodiments, like components are labeled with like reference numbers (e.g., socket 24, socket 124, socket 224 . . . ). Except as otherwise detailed, the general structure and function of the ball swivels in each subsequent embodiment is the same as in the previous; hence, previously described features and functions will not be repetitively described.

Referring to FIGS. 6-9, according to an embodiment of the present invention, a ball swivel 110 includes a pair of stoppers 160 arranged externally to the male and female portions 112, 114 (the ball swivel 110 is symmetrical such that an opposite side view from FIG. 6 would be identical thereto). The stoppers 160 delimit relative translational movement between the male and female portions 112, 114 toward one another along the longitudinal axis 120 while still permitting relative rotational and pivotal motions 116, 122.

In the depicted embodiment, the stoppers 160 are fixed to the male portion 112; alternately, stoppers could be fixed to the female portion. The stoppers 160 extend toward the female portion 114 from a collar 162 of the male portion 112 surrounding the second male opening 136. Preferably, the stoppers 160 each have a rounded surface 164 at the contact points with the female portion 114, which, as depicted, is on the socket 126 around the perimeter of the first female opening 140. Advantageously, the stoppers are molded, or otherwise formed, integrally with the male portion (or female portion, if fixed thereto); however, stoppers could be formed separately and subsequently affixed.

Advantageously, the contact points of the stoppers 160 are separated along a stopper axis 166 which passes through an internal center point 170 of the truncated ball 124. This configuration ensures that the female portion 114 is still able to move through its full range of pivotal motion 122, although constrained to pivot about the stopper axis 166. In the event the male portion 112 of the ball swivel 110 is fixed to a pool cleaner, the axis of pivotal motion 122 will accordingly be fixed relative thereto—regardless of rotation of the female portion 114. If the female portion 114 is fixed to the pool cleaner, the axis of pivotal motion 122 will be rotatable relative thereto along with the male portion 112.

By delimiting longitudinal motion, the user of the stoppers 160 prevents undesirable engagement between the ball 124 and the socket 126 and the consequent binding. Additionally, by preserving the proper alignment between the ball 124 and socket 126, proper sealing with the wiper seal 144 under suction load is ensured—as can be seen even in the extremes of pivotal motion 122 detailed in the insets of FIG. 9.

Fixing the stoppers 160 as shown in the depicted embodiment delimits relative translational motion of the male and female portions 112, 114 toward one another, as would be experienced under suction loading. Under pressure loading, the male and female portions of a ball swivel would be urged apart along the longitudinal axis (i.e., opposite the arrows 50 in FIG. 4). In the case of a ball swivel to be used in an application where a pressure loading was expected, the stoppers would be positioned to delimit translation motion of the male and female portions away from one another.

While undergoing rotational motion 120 under suction load, the female portion 114 bears continuously on the contact points of the stoppers 160, making this a high wear area. Referring to FIGS. 10-14, in a ball swivel 210, a spacer 272 is arranged between the stoppers 260 and the female portion 214, minimizing or eliminating rotation-caused wear on the stoppers 260. The spacer 272 is preferably made of a material with enhanced wear characteristics, such as a polytetrafluoroethylene-based or acetal-based material. Additionally, the spacer 272 is preferably independently removable and replaceable if worn beyond a desirable extent, preventing replacement of additional ball swivel 210 components.

The female portion 214 is rotatable relative to the spacer 272, leaving the capacity for rotational motion 216 unaffected. Preferably, the socket 226 has a collar 274 extending around the exterior thereof, an underside of which directly engages the spacer 272. A surface 276 of the stopper 272 abutting the collar 274 is crenelated to reduce the contact area, and resulting friction, therebetween.

To prevent the collar 274 from rotating with the female portion 214, mounting recesses 280 are formed thereon which seat on the contact points of the stoppers 260. The mounting recesses 280 still allow the spacer 272 and female portion 214 a full range of pivotal motion 222 about the stopper axis 266, but prevent spacer 272 rotation.

Figure 16:
FIG. 16 is a perspective view of the male portions of the dual ball swivel of FIG. 15.
Figure 17:
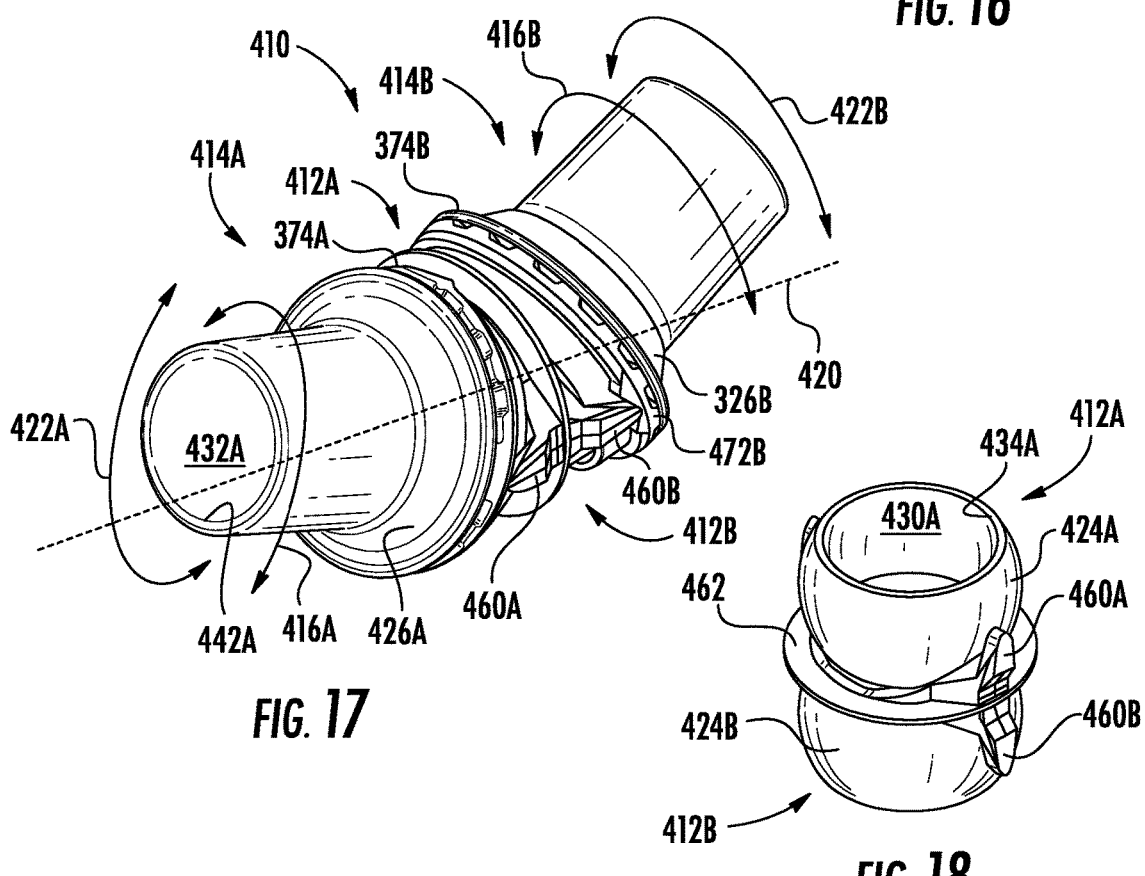
FIG. 17 is a perspective view of dual ball swivel, according to an additional embodiment of the present invention.
Figure 18:
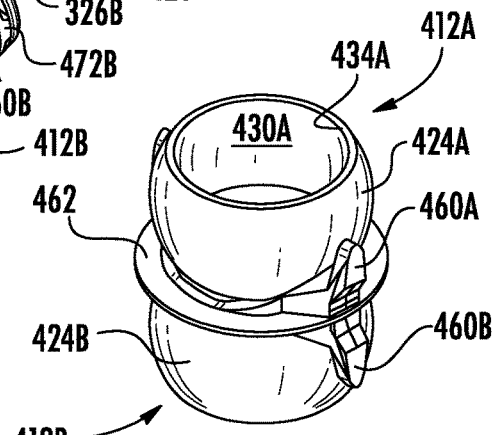
FIG. 18 is a perspective view of the male portions of the dual ball swivel of FIG. 17.

The preceding features can also be used with dual swivels, similar to that disclosed in U.S. Pat. No. 7,464,429. Referring to FIGS. 15 and 16, the ball swivel 310 features two sets of male and female portions 312A/B, 314A/B and associated components, including stoppers 360A/B and spacers 372A/B, that function substantially as described above, except the serial combination of the sets allows for a higher degree of articulation across the entire ball swivel 310.

In the depicted embodiments, the two male portions 312A/B are fixed directly at the respective second openings of their truncated balls 324A/B. The stoppers 360A/B extend away from a common collar 362 around the junction therebetween. In the ball swivel 310, the stoppers 360A are radially offset from the stoppers 360B about the longitudinal axis 320. Alternately, in a ball swivel 410, the stoppers 460A are aligned with the stoppers 460B in the direction of the longitudinal axis 420.

From the foregoing, it will be appreciated that the ball swivels of the present invention advantageously prevent binding and leakage under load, while still permitting rotational and pivotal movement. However, the foregoing embodiments are provided for exemplary and illustrative purposes; the present invention is not necessarily limited thereto. Rather, those skilled in the art will appreciated that various modifications, and as well as adaptations to particular circumstances, will fall within the scope of the invention herein shown and described, and of the claims appended hereto.

What is claimed is:

1. A ball swivel for a pool cleaner, the ball swivel comprising:
   a first male portion including a truncated ball, a male fluid passage being formed through the first male portion extending between first and second male portion openings, the first male portion opening being located on the truncated ball,
   a first female portion including a socket receiving the truncated ball via a first female portion opening, a female fluid passage extending from a second female portion opening and communicating with the male fluid passage through the first male portion opening, the socket retaining the truncated ball such that the first female and male portions are capable of relative rotational motion throughout 360 degrees about a longitudinal axis separating the first male and female portion openings and relative pivotal motion toward and away from the longitudinal axis; and
   at least a first stopper arranged externally to the first male and female portions delimiting relative translation movement therebetween in at least one direction along the longitudinal axis while still permitting the relative rotational motion throughout 360 degrees and the relative pivotal motion;
   wherein the first stopper is arranged to delimit the relative translational movement of the first male and female portions toward one another along the longitudinal axis, and
   wherein the first stopper is fixed to the first male portion.

2. The ball swivel of claim 1, wherein the first male portion includes a collar extending around the second male portion opening, the first stopper extending from the collar toward the first female portion.

3. The ball swivel of claim 1, further comprising a second stopper arranged externally to the first male and female portions and delimiting relative translation movement therebetween toward one another along the longitudinal axis.

4. The ball swivel of claim 3, wherein the first and second stoppers engage the first female portion at respective contact points separated by a stopper axis passing through a center point of the truncated ball, the relative pivotal motion between the first male and female portions being constrained to pivoting about the stopper axis.

5. The ball swivel of claim 4, wherein the first and second stoppers each have a rounded surface at the respective contact points thereof.

6. The ball swivel of claim 1, further comprising a spacer arranged between the first female portion and the first stopper such that the first stopper engages the first female portion through the spacer.

7. The ball swivel of claim 6, wherein the first female portion is rotatable about the longitudinal axis relative to the spacer.

8. The ball swivel of claim 7, wherein the socket includes a collar extending around an exterior thereof, the spacer engaging the collar.

9. The ball swivel of claim 8, wherein the spacer is crenelated along its engagement within the collar, reducing the contact area therebetween.

10. The ball swivel of claim 7, wherein the spacer includes a mounting recess that engage the first stopper and prevents the stopper from rotating about the longitudinal axis relative to the first male portion.

11. The ball swivel of claim 1, further comprising:
   a second male portion including an additional truncated ball, an additional male fluid passage being formed through the second male portion extending between additional first and second male portion openings, the additional first male portion opening being located on the additional truncated ball;
   a second female portion including an additional socket receiving the additional truncated ball via an additional first female portion opening; an additional female fluid passage extending from an additional second female portion opening and communicating with the additional male fluid passage through the additional first male portion opening, the additional socket retaining the additional truncated ball such that the second female and male portions are capable of relative rotational motion about an additional longitudinal axis separating the additional first male and female portion openings and relative pivotal motion toward and away from the additional longitudinal axis; and
   at least a second stopper arranged externally to the second male and female portions delimiting relative translation movement therebetween in at least one direction along the additional longitudinal axis while still permitting the relative rotational motion and the relative pivotal motion;

wherein the second male and female portions are connected in series with the first male and female portions such that the male and female fluid passages and the additional male and female fluid passages are in communication.

12. The ball swivel of claim 11, wherein the first and second male portions are directly connected at the second male portion opening and the additional second male portion opening, the first and second stoppers being fixed at a junction therebetween, and the longitudinal axis and the additional longitudinal axes being coaxial.

13. The ball swivel of claim 12, wherein the first and second stoppers are aligned in the direction of the longitudinal axis.

14. The ball swivel of claim 12, wherein the first and second stoppers are radially offset about the longitudinal axis.

15. The ball swivel of claim 14, wherein the first and second stoppers are radially offset by 90 degrees.

16. A ball swivel for a pool cleaner, the ball swivel comprising:

a first male portion including a truncated ball, a male fluid passage being formed through the first male portion extending between first and second male portion openings, the first male portion opening being located on the truncated ball;

a first female portion including a socket receiving the truncated ball via a first female portion opening, a female fluid passage extending from a second female portion opening and communicating with the male fluid passage through the first male portion opening, the socket retaining the truncated ball such that the first female and male portions are capable of relative rotational motion throughout 360 degrees about a longitudinal axis separating the first male and female portion openings and relative pivotal motion toward and away from the longitudinal axis; and first and second stoppers arranged externally to the first male and female portions delimiting relative translation movement therebetween in at least one direction along the longitudinal axis while still permitting the relative rotational motion throughout 360 degrees and the relative pivotal motion, the first and second stoppers being fixed to the first male portion and engaging the first female portion at respective contact points separated by a stopper axis passing through a center point of the truncated ball, the relative pivotal motion between the first and female portions being constrained to pivoting about the stopper axis.

17. The ball swivel of claim 16, wherein the first male portion includes a collar extending around the second male portion opening, the first and second stoppers extending from the collar toward the first female portion.

18. The ball swivel of claim 17, further comprising a spacer arranged between the first female portion and the first and second stoppers such that the first and second stoppers engage the first female portion through the spacer.

19. The ball swivel of claim 18, wherein the first female portion is rotatable about the longitudinal axis relative to the spacer;

wherein the socket includes an additional collar extending around an exterior thereof, the spacer engaging the additional collar; and wherein the spacer includes first and second mounting recesses that engage the first and second stoppers, respectively, and prevent the stopper from rotating about the longitudinal axis relative to the first male portion.

* * * * *